H. A. WILSON.
DEFLATED TIRE SIGNAL.
APPLICATION FILED MAY 13, 1921.
1,425,733. Patented Aug. 15, 1922.
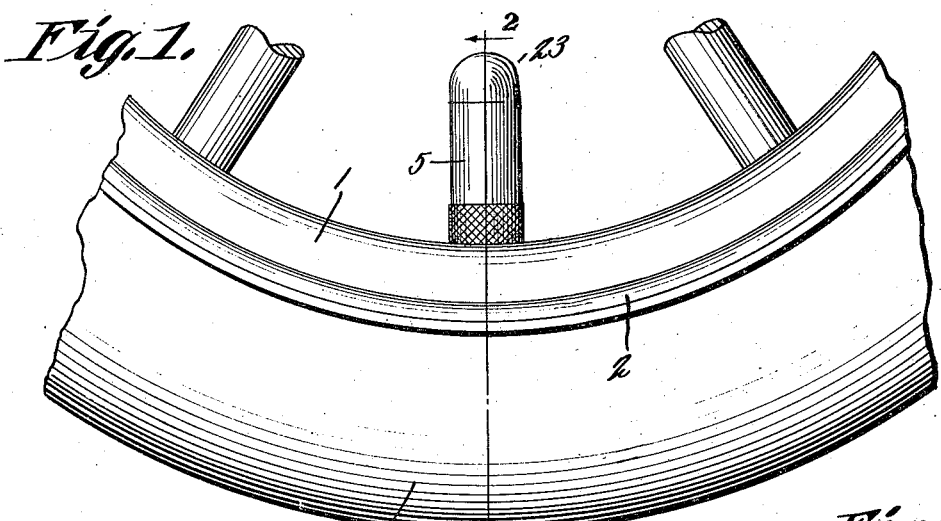
Fig. 1.
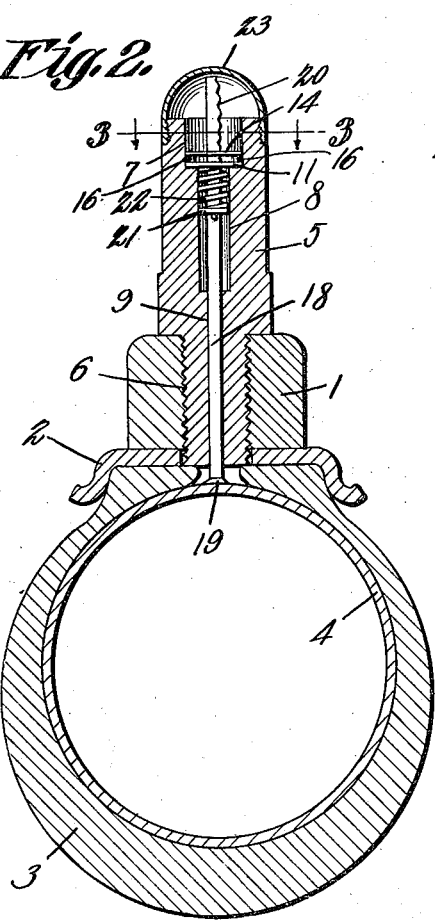
Fig. 2.
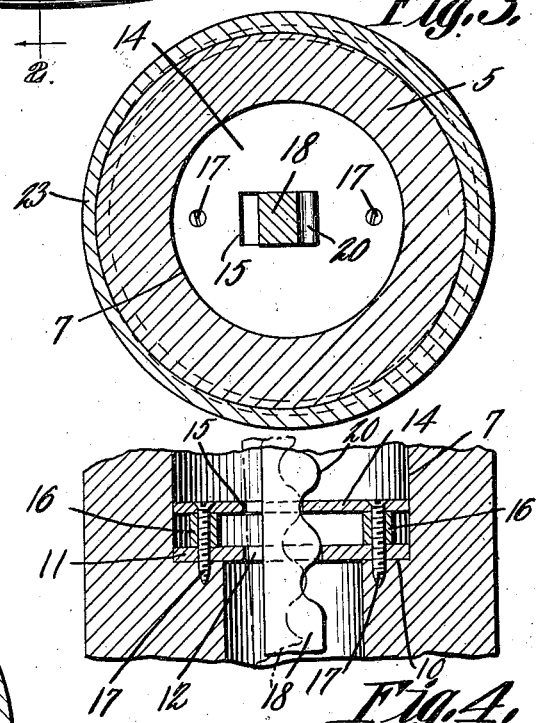
Fig. 3.
Fig. 4.
Inventor,
H. A. Wilson.
By C. A. Snow & Co.
Attorney.

UNITED STATES PATENT OFFICE.

HUGH A. WILSON, OF MANKATO, MINNESOTA.

DEFLATED-TIRE SIGNAL.

1,425,733.     Specification of Letters Patent.    Patented Aug. 15, 1922.

Application filed May 13, 1921. Serial No. 469,290.

*To all whom it may concern:*

Be it known that I, HUGH A. WILSON, a citizen of the United States, residing at Mankato, in the county of Blue Earth and State of Minnesota, have invented a new and useful Deflated-Tire Signal, of which the following is a specification.

It is the object of this invention to provide a simple but effective means whereby a signal will be given, when a pneumatic tire loses its air on the road or elsewhere, to the end that the driver may not operate the car in ignorance, on a flat tire, to the injury of the tire.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a portion of a wheel body carrying a device constructed in accordance with the invention; Figure 2 is a section taken approximately on the line 2—2 of Figure 1; Figure 3 is a section taken on the line 3—3 of Figure 2; and Figure 4 is a detail enlarged from Figure 2.

In the drawings, there is shown a wheel body comprising a felly 1 and a rim 2, the rim carrying a casing 3 within which is located an inflatable tube 4.

In carrying out the invention, there is provided a tubular guide 5 having a reduced stem 6 threaded into the felly 1 and the rim 2. The guide 5 has an outer bore 7, an intermediate bore 8 and an inner bore 9. The outer bore 7 of the guide is of greater diameter than the intermediate bore 8, thereby forming a shoulder 10.

An abutment disk 11 rests on the shoulder 10 and has an opening 12. The numeral 14 denotes a resonant diaphragm, which is resilient, the diaphragm being provided with an opening 15. The diaphragm 14 is located in the bore 8 and is separated from the abutment disk 11 by spacers 16. Securing elements 17, such as screws, pass through the diaphragm 14, through the spacers 16, through the abutment disk 11 and into the shoulder 10, thereby holding the diaphragm and the abutment disk in place.

A plunger 18 is mounted for right line reciprocation in the inner bore 9 of the guide 5 and is supplied at its inner end with a button 19, made of rubber or like material, and adapted to bear against the inner tube 4, the object in view being to prevent the injury of the inner tube by contact with the plunger. The outer end of the plunger may be slightly resilient and is provided with teeth 20, the outer end of the plunger passing through the opening 12 in the abutment disk 11 and through the opening 15 in the diaphragm 14, the teeth 20 engaging the diaphragm 14 at one end of the opening 15 therein. An abutment 21 is mounted on the plunger 18 and is located in the intermediate bore 8 of the guide 5. A compression spring 22 surrounds a portion of the plunger 18, one end of the spring 22 engaging the abutment disk 11, and the other end of the spring engaging the abutment 21 on the plunger 18. A cap 23, made of aluminum or like material, is threaded on the outer end of the guide 5.

In practical operation, when the tube 4 is inflated, the tube expands and pushes the plunger 18 outwardly, overcoming the action of the spring 22. When, due to a puncture or otherwise, the tube 4 loses its air and flattens, the spring 22 asserts itself and thrusts the plunger 18 inwardly, thereby causing the teeth 20 on the plunger to traverse the diaphragm 14, at one end of the opening 15, the diaphragm being vibrated and a rasping strident sound being produced.

The device hereinbefore described although simple in construction, affords a simple means whereby an audible signal may be given at any time to the driver of a vehicle, admonishing the driver that a tire on the vehicle has failed.

I claim:—

In a deflated tire signal, a guide; an abutment disk in the guide; a resonant diaphragm in the guide; means for securing the diaphragm and the disk to the guide; a plunger slidable in the guide and passing through the abutment disk and the diaphragm, the plunger having teeth engaging the diaphragm; an abutment on the plunger; and a compression spring interposed between the abutment and the abutment disk.

In testimony that I claim the foregoing as my own, I have hereto affixed my signature in the presence of two witnesses.

HUGH A. WILSON.

Witnesses:
B. D. GROGAN,
IRENE DIEGNAN.